(12) United States Patent
Singh et al.

(10) Patent No.: US 11,096,092 B2
(45) Date of Patent: Aug. 17, 2021

(54) SERVICE AWARE COVERAGE DEGRADATION DETECTION AND ROOT CAUSE IDENTIFICATION

(71) Applicant: VMWARE, INC., Palo Alto, CA (US)

(72) Inventors: Sarabjot Singh, Palo Alto, CA (US); Srikanth Hariharan, Sunnyvale, CA (US); Adnan Raja, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 60 days.

(21) Appl. No.: 16/718,530

(22) Filed: Dec. 18, 2019

(65) Prior Publication Data

US 2020/0128446 A1    Apr. 23, 2020

Related U.S. Application Data

(60) Provisional application No. 62/781,322, filed on Dec. 18, 2018, provisional application No. 62/854,058, filed on May 29, 2019.

(51) Int. Cl.
| | |
|---|---|
| *H04W 4/00* | (2018.01) |
| *H04L 12/28* | (2006.01) |
| *G06F 15/173* | (2006.01) |
| *H04W 28/24* | (2009.01) |
| *H04W 24/08* | (2009.01) |
| *H04W 28/02* | (2009.01) |
| *H04L 12/24* | (2006.01) |
| *H04W 36/30* | (2009.01) |
| *H04W 24/02* | (2009.01) |

(52) U.S. Cl.
CPC .............. *H04W 28/24* (2013.01); *H04L 41/22* (2013.01); *H04W 24/02* (2013.01); *H04W 24/08* (2013.01); *H04W 28/0268* (2013.01); *H04W 36/30* (2013.01)

(58) Field of Classification Search
CPC . H04W 28/24; H04W 24/08; H04W 28/0268; H04W 36/30; H04W 24/02; H04W 24/04; H04L 41/22; H04L 41/142; H04L 41/16; H04L 41/145
USPC ........................................................ 370/329
See application file for complete search history.

(56) References Cited

U.S. PATENT DOCUMENTS

| | | | |
|---|---|---|---|
| 8,380,850 B1 * | 2/2013 | Ahuja ..................... | H04L 67/32 709/225 |
| 8,515,434 B1 * | 8/2013 | Narendran ............ | H04W 48/02 455/446 |
| 10,944,664 B2 * | 3/2021 | Ling .................... | H04L 43/0858 |
| 2003/0152083 A1 * | 8/2003 | Nagata ................ | H04L 47/6265 370/395.4 |

(Continued)

*Primary Examiner* — Mark G. Pannell
(74) *Attorney, Agent, or Firm* — Clayton, McKay & Bailey, PC

(57) ABSTRACT

A system can include a network analysis platform that applies performance models to determine if a coverage degradation exists at a network cell, such as at a base station. The performance models are pre-trained based on network telemetry data. For a session at a cell, an expected quality of service ("QoS") metric can be compared to an actual QoS metric to determine whether the session is impacted by coverage degradation. Throughput is an example QoS metric. If the number of impacted sessions exceeds a threshold, the base station can be highlighted on a GUI. Additionally, the network analysis platform can perform root cause analysis of a victim cell.

20 Claims, 8 Drawing Sheets

(56) References Cited

U.S. PATENT DOCUMENTS

| | | | | |
|---|---|---|---|---|
| 2004/0228287 | A1* | 11/2004 | Seol | H04W 52/267 |
| | | | | 370/252 |
| 2008/0159133 | A1* | 7/2008 | Yeung | H04W 28/10 |
| | | | | 370/230 |
| 2009/0262753 | A1* | 10/2009 | On | H04L 45/00 |
| | | | | 370/466 |
| 2010/0067396 | A1* | 3/2010 | Cui | H04W 28/0205 |
| | | | | 370/252 |
| 2010/0100627 | A1* | 4/2010 | Evans | H04W 76/14 |
| | | | | 709/227 |
| 2010/0124887 | A1* | 5/2010 | Wellington | H04W 24/04 |
| | | | | 455/69 |
| 2010/0217888 | A1* | 8/2010 | Ukita | H04N 21/6379 |
| | | | | 709/234 |
| 2011/0032919 | A1* | 2/2011 | Mouhouche | H04L 25/03019 |
| | | | | 370/342 |
| 2013/0301435 | A1* | 11/2013 | Panah | H04W 52/0212 |
| | | | | 370/252 |
| 2014/0064187 | A1* | 3/2014 | Yokoyama | H04W 28/18 |
| | | | | 370/328 |
| 2014/0204871 | A1* | 7/2014 | Ode | H04L 5/005 |
| | | | | 370/329 |
| 2015/0063481 | A1* | 3/2015 | Von Wrycza | H04B 7/0691 |
| | | | | 375/267 |
| 2015/0181448 | A1* | 6/2015 | Otonari | H04L 5/1469 |
| | | | | 370/252 |
| 2016/0360220 | A1* | 12/2016 | Song | H04N 19/142 |
| 2017/0339672 | A1* | 11/2017 | Tajima | H04W 36/14 |
| 2017/0347112 | A1* | 11/2017 | Zhang | H04L 65/602 |
| 2017/0353914 | A1* | 12/2017 | Jung | H04W 48/18 |
| 2018/0063748 | A1* | 3/2018 | Ling | H04W 48/20 |

* cited by examiner

SERVICE AWARE COVERAGE DEGRADATION DETECTION AND ROOT CAUSE IDENTIFICATION

CROSS-REFERENCE TO RELATED APPLICATIONS

This non-provisional application claims priority to provisional application No. 62/781,322 titled "Service Aware LTE-RAN Load Imbalance Detection and Root Cause Identification Framework," filed Dec. 18, 2018, and also claims priority to provisional application No. 62/854,058, titled "Systems and Methods for Service Aware Uplink Quality Degradation Detection," filed May 29, 2019, both of which are incorporated by reference in their entireties.

BACKGROUND

Telco systems rely on acceptable wireless signal quality in order to provide adequate service to its users. Wireless signal quality, or "coverage," is one of the fundamental quantities on which the quality of a service ("QoS") delivered wirelessly depends. Poor signal quality can lead to, for example, degradation of downlink throughput and uplink throughput due to the lower modulation and coding required to maintain acceptable packet loss rates. It can also negatively impact voice quality for users' calls when packet loss rates increase. Poor signal quality also causes call drops based on the user equipment failing to establish a reliable control signal with the network infrastructure.

Current systems identify problems with wireless signal quality based on triggers that do not accurately capture real-word effects and service level impacts. For example, the triggers operate on network telemetry data, such as the frequency of events where the signal falls below a threshold. But these triggers do not consider, for example, the natural performance degradation in signal quality as a user device moves further from a base station. The systems therefore cannot differentiate between degradation based on the distance of a user device versus degradation caused by network misconfiguration. They also do not account for service level impacts, leading to excessive false alarms and faulty detections. Such systems also do not provide an ability to detect an underlying root cause of detected problems.

As a result, a need exists for detecting sessions suffering from service degradation caused by degraded signal quality in the serving base station and identifying the root cause responsible for that decreased signal strength.

SUMMARY

Examples described herein include systems and methods for poor wireless coverage detection and root cause analysis ("RCA") in a telco network. A network analysis platform can detect a session suffering from poor wireless coverage at a network cell, such as a base station, and display a related alert on a graphical user interface ("GUI"). The network analysis platform can use one or more performance models that are trained to determine an impacted session based on coverage state. The performance model can be trained based on historical data. A current coverage state can be compared against an expected coverage state based on normalized coverage stage features that can be used as inputs to the performance model. The coverage state can be an output from the performance model, and can indicate a QoS level, expected or actual, in an example.

In one example, the network analysis platform can receive telemetry data from network components. The telemetry data can include performance-related information for cells in the network, such as base stations. The telemetry data can be session-specific, related to cellular connections in the network. For example, the telemetry data can relate to signal quality, cell load, and interference level.

To detect a session impacted by poor coverage, the network analysis platform can compare actual and expected coverage stages for a first base station among multiple base stations. The expected coverage state can be based on normalized coverage features. One such normalized feature can be a normalized path loss value that is set to a normalized percentile compared to other cells in the network. This can include determining the percentile of path loss for a first base station relative to an average path loss for multiple base stations in the telco network, in an example. Using the normalized features, the network analysis platform can predict an expected coverage state, such as based on at least a threshold non-acknowledged packet rate and the percentile of path loss. The normalized signal quality is can be based on at least one of: a percentile of the first sessions' path loss relative to signal quality of other sessions at the first base station, overall path loss across the plurality of base stations, an acknowledgement rate across the plurality of base stations, and a negative acknowledgement rate across the plurality of base stations.

To determine an impacted wireless session that suffers from poor coverage in its serving cell, the network analysis platform can compare the actual coverage state with the expected coverage state. In one example, this can include comparing an expected throughput value (T2) output from the performance model based on the normalized features to the actual throughput (T1). Throughput is one example of a QoS metric that can be output by the model. The model can consider natural path loss based on a distance between a user device and the first base station. If a threshold difference exists between T2 and T1, then the network analysis platform can identify an impacted session. If a threshold number of impacted sessions exist with poor coverage, the network analysis platform can identify the first base station as the wireless station with poor coverage. This can be indicated on a GUI. For example, the GUI can show the first base station on a map and highlight the base station in a manner that indicates poor coverage. In one example, the GUI indicates how many sessions are impacted by the poor coverage at the base station.

The network analysis platform can also perform RCA on serving cells with poor coverage. The root cause can identify a serving cell that does not have the correct transmit power or tilt configuration. To determine the root cause, the network analysis platform can determine a distribution of average path loss across the cells of the network. If the serving cell's average path loss is higher than a 75th percentile of the distribution, the network analysis platform can identify that cell as having a systemic poor path loss that indicates incorrect transmit power or electronic tilt configuration.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

The system can include a network analysis platform that applies performance models to determine if coverage degradation exists at a cell, such as at a base station. The performance models are trained based on network telemetry data that is collected by the network analysis platform. For a session at a cell, an expected coverage state can be compared to an actual coverage state to determine whether the session is impacted by coverage degradation. This can be done by comparing a QoS metric output from a performance model, such as throughput. The expected coverage state can be determined by applying normalized factors to the performance model, such as path loss, coverage quality index ("CQI"), and non-acknowledgement ("NACK") rate. In one example, these factors can be scaled to represent to represent a 75th percentile case within the network based on the other cells (e.g., base stations) in the network. Some factors of the session can remain static to provide session-specific context, such as signal quality and interference level. If the expected and actual coverage state values diverge beyond a threshold amount, this can indicate that the session is impacted by coverage degradation.

A GUI can display the cells and number of corresponding sessions impacted by a cell's coverage degradation. When the number or impacted sessions exceeds a threshold, RCA can also be performed so that an administrator or automated process can take corrective action. For example, by analyzing incoming and outgoing handoffs at a victim cell, the GUI can display a root cause of vendor load balancing parameters is a root cause or a coverage footprint of the base station is a root cause.

Figure 1:
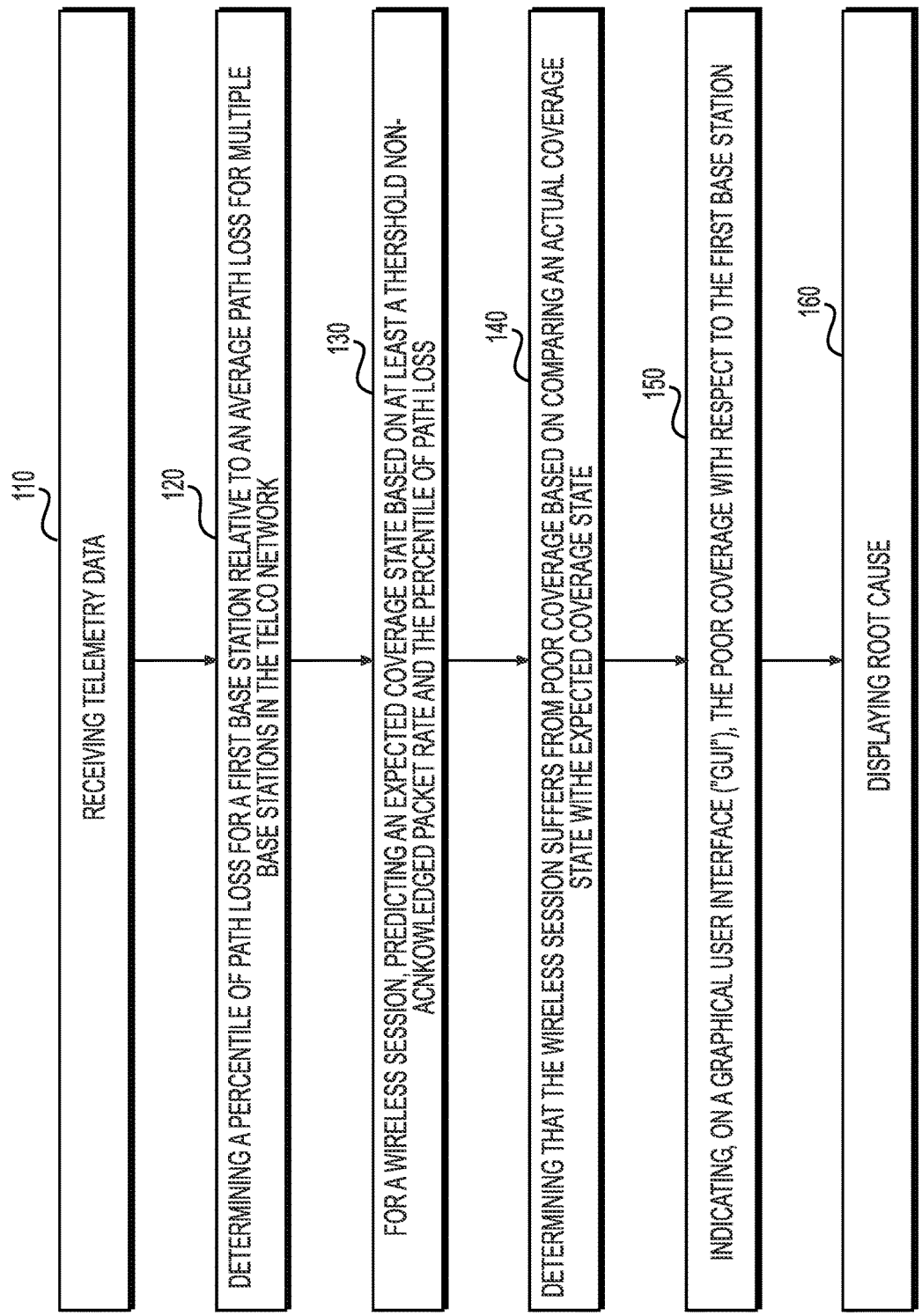
FIG. 1 is a flowchart of an example method for poor coverage detection and root cause identification.

FIG. 1 is a flowchart of an example method coverage degradation detection and root cause identification. At stage 110, the network analysis platform can receive telemetry data from cells in the network. Example cells can include base stations, cell towers, or any node within the network. The telemetry data can include key performance indicators ("KPIs"), such as round-trip time for data packets, latency, and other indicators that can be used to determine throughput. The telemetry data can also include path loss information for at least one user network session, signal quality measurements, NACK rate, and CQI. This information will also be described in more detail with respect to FIG. 3B.

At stage 120, the network analysis platform can determine features for use with a performance model for predicting an expected coverage state. One such feature can be based on a percentile of path loss for the server cell (i.e., first base station) being analyzed. The percentile path loss can be preserved as actual and determined relative to an average path loss for multiple other cells in the network. For example, the cell being analyzed can have a path loss percentile of normalized feature can be path loss at a certain percentile, such as 45 percent, reflecting how the path loss of the cell compares to the other cells in the network. A similar percentile can be obtained for CQI based on the session's CQI for the path loss.

Then, using this percentile, normalized features for that percentile can be determined. These normalized features can then be used to predict an expected coverage state. Table 1 shows these features, and how they are used to normalize a NACK rate and normalize a second CQI. These signal quality features can be used with the performance model in an example.

TABLE 1

Example features used with performance model.

| Feature | Description |
| --- | --- |
| Path Loss$_{New}$ (session) | $Q^{th}$ percentile of path loss over the network, where Q is the percentile of the session's path loss in its serving cell. |
| CQI$_{New}$ (session) | $C^{th}$ percentile of CQI over the network for the Path Loss$_{New}$, where C is the percentile of the session's average CQI for its path loss. |
| NACK rate (normalized) | $75^{th}$ percentile of NACK rate corresponding to the CQI$_{New}$ over the network if CQI$_{New}$ is greater than the session's average CQI, otherwise no change to the NACK rate. |
| CQI2 (normalized) | CQI2 + CQI$_{New}$ minus the sesssion's average CQI if CQI2 is greater than 0, otherwise 0. |

As shown above, the new path loss can be determined for the session as the path loss for the $Q^{th}$ percentile of pass loss over cells in the network. Q can be the percentile of the pass loss for the session in the serving cell relative to other sessions in the serving cell. Path loss is generally a function of distance and frequency. For example, if a session's path loss is at the median (50%) within its serving cell, then the median path loss value for a typical cell is used as the new path loss, in an example.

Similarly, the new CQI can be determined as the CQI for the $C^{th}$ percentile of CQI over the network for the Path Loss$_{New}$, where C is the percentile of the session's average CQI for its path loss. CQI is a measure of signal to interference ratio. The new CQI can be set to the $C^{th}$ percentile path loss. In other words, the nominal CQI value at 50% of the cells in the network would be the new CQI. Cells can transmit at higher and lower power, be macro or micro, and the cells used to determine the new CQI can be of similar cell type to the serving cell. In this way the percentile of the serving cell is preserved.

The normalized NACK rate can be based on NACK rates measured from telemetry data. It can be set at $75^{th}$ percentile, in an example, if the new CQI is greater that the original CQI. Otherwise, the NACK rate of the serving cell can be used.

The second CQI (CQI2) is a ratio for a RAND2 transmission, since a cell often can transmit in multiple modes. The New CQI2 can be boosted based on a higher average CQI.

These four features can be used as inputs to the performance model at stage 130. At stage 130, the network analysis platform can predict an expected coverage state using the performance model and one or more features of Table 1. The interference of the cell can remain the same so as not to impact detection of degraded coverage. Using these inputs, the performance model can output an estimated throughput value in an example. The normalized inputs can be selected to estimate what the cell's throughput would be (for the session) with non-degraded coverage, such as at a cell performing at a 75% level compared to the other cells in the network. The performance model can be a pre-trained regression model that outputs expected throughput based on the input factors. The training can include applying machine learning algorithms to a large set of telemetry data to tune a performance model for predicting throughput.

Stage 140 can include determining that expected throughput exceeds the actual throughput value by at least a threshold amount. In one example, the difference between the expected and actual throughput represents the impact of poor coverage on a session at the cell. If that impact is large enough, then the network analysis platform can count the impact against the cell. For example, when a threshold is exceeded, poor coverage is indicated. In more detail, if the normalized features are used to output a throughput (T2) representative of an expected throughput for a top 25% cell (based on load), then the actual throughput (T1) can be compared against T2 to determine how impacted the cell is. If the difference between T2 and T1 is beyond a threshold, then the session is impacted by a load imbalance. T2 can represent the potential improvement available at the cell if the load for the session was balanced similarly to a $75^{th}$ percentile cell. When a threshold number of session impacts occur, the cell can be classified as having coverage degradation.

At stage 150, the GUI can indicate that the first base station has poor coverage (i.e., coverage degradation). In one example, the GUI represents cells in the network, including the first base station. These cells can be represented on a map relative to their geographic locations. The first base station can be highlighted on the map when a threshold number of session impacts are detected for the first base station. For example, the network analysis platform can count each session that is impacted in stage 140 and display the number of impacted sessions, in an example. If the number of impacted sessions exceeds a threshold, then that number or an icon on the GUI can be highlighted to draw the administrator's attention.

At stage 160, the GUI can also display a root cause for the coverage degradation. A cell with poor coverage can be referred to as a "victim cell." For a victim cell, the GUI can also display additional information about the root cause of the coverage issue. The network analysis platform can determine root cause based on computing a distribution of average path loss across cells of the network. If the victim cell's average path loss is higher than the $75^{th}$ percentile in the above distribution, this can indicate that the cell has a systemic poorer path loss, indicating incorrect transmit power or electronic tilt configuration.

In one example, the GUI can provide options for the user to drill down on victim cells to investigate root cause. For example, the user can select the victim cell, causing the GUI to display various alerts associated with that cell.

Figure 2:
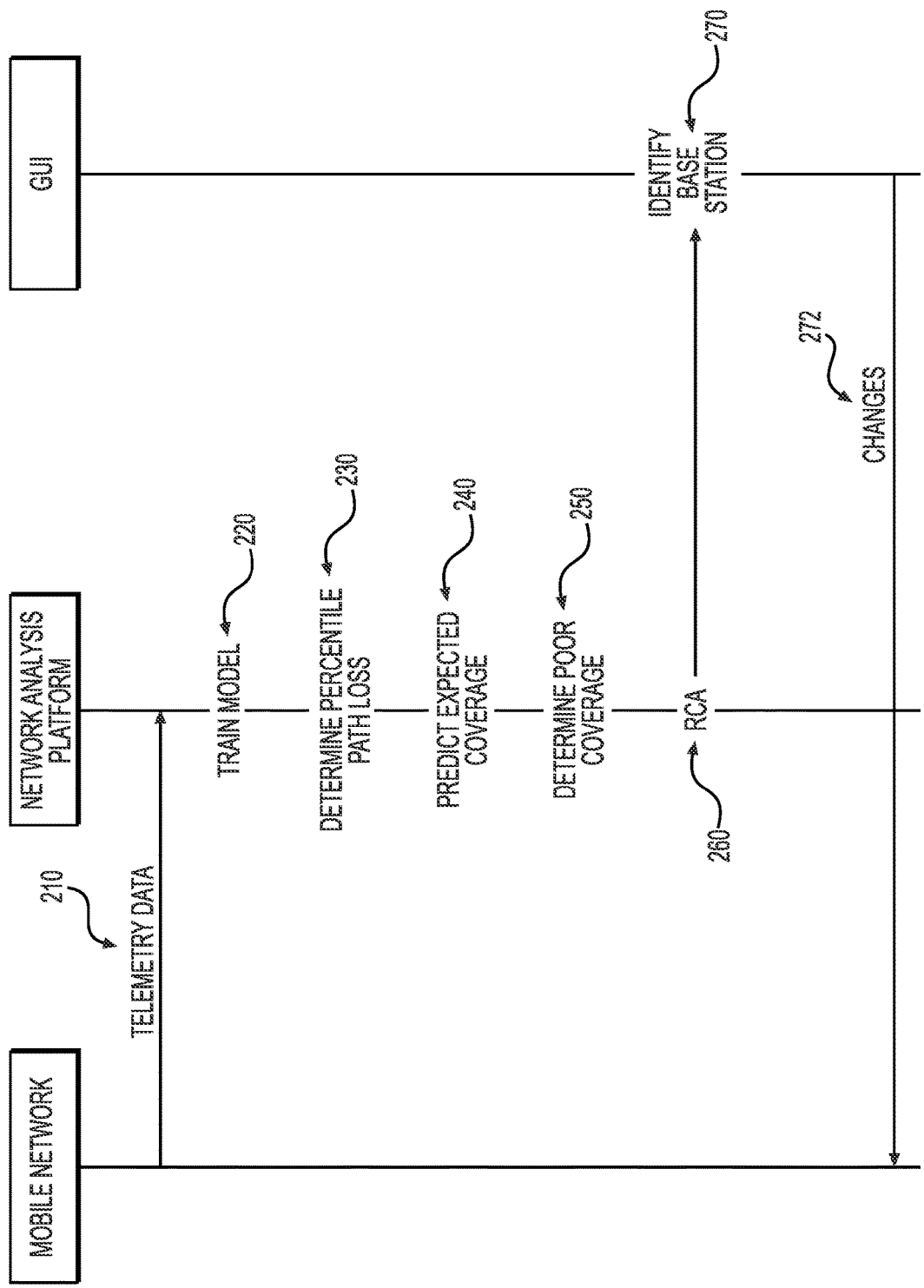
FIG. 2 is a sequence diagram of an example method for poor coverage detection and root cause identification.

FIG. 2 is a sequence diagram of an example method for coverage degradation detection and root cause analysis. At stage 210, telemetry data can be received at the network analysis platform from various cells within the mobile network. Stage 210 can be ongoing in an example, with telemetry data being received at periodic intervals or constantly queued from reporting cells. The telemetry data can be captured and measured in real time by base stations, which send the telemetry data to the network analysis platform.

Based on past telemetry data, at stage 220 the network analysis platform or some other process can train a performance model. Regression analysis and machine learning can be used to train the model. In one example, the inputs from Table 1 are used to train the model with respect to throughput, which can be measured at a cell. This can result in a model that will output a throughput value based on inputs related to path loss and CQI, such as those of FIG. 1.

At stage 230, percentage path loss and percentage CQI can be determined. This can occur in the manner already explained with respect to Table 1, in an example. The percentiles can be used to normalize one or more of path loss, CQI, or NACK rate, as explained above. Then, at stage 240, these normalized values can be used to determine an expected coverage state. An actual coverage can also be determined, such as by using the actual path loss, CQI, or NACK rate of a cell that serves the session.

By comparing the outputs (such as throughput) at the expected coverage state and the actual coverage state, the network analysis platform can determine if the coverage is poor for that session. At stage 250, degraded coverage can be determined for a base station with respect to a session when the expected coverage state output exceeds the actual coverage state by a threshold.

When poor coverage exists, the network analysis platform can perform RCA at stage 260. In one example, the network analysis platform can determine root cause based on computing a distribution of average path loss across cells of the network. If the victim cell's average path loss is higher than the $75^{th}$ percentile in the above distribution, this can indicate that the cell as a systemic poorer path loss indicating incorrect transmit power or electronic tilt configuration.

The root cause can be communicated to the GUI. At stage 270, the GUI can identify the base station as having coverage degradation. This can occur when a threshold number of sessions are impacted based on stage 250. The GUI can also present the root cause. This can allow an administrator to determine what changes need to be made to fix the poor coverage. In one example, these changes can be made automatically by communicating at stage 272 with an interface for the victim cell. For example, the changes at stage 272 can adjust signal strength or tilt angle.

Figure 3A:
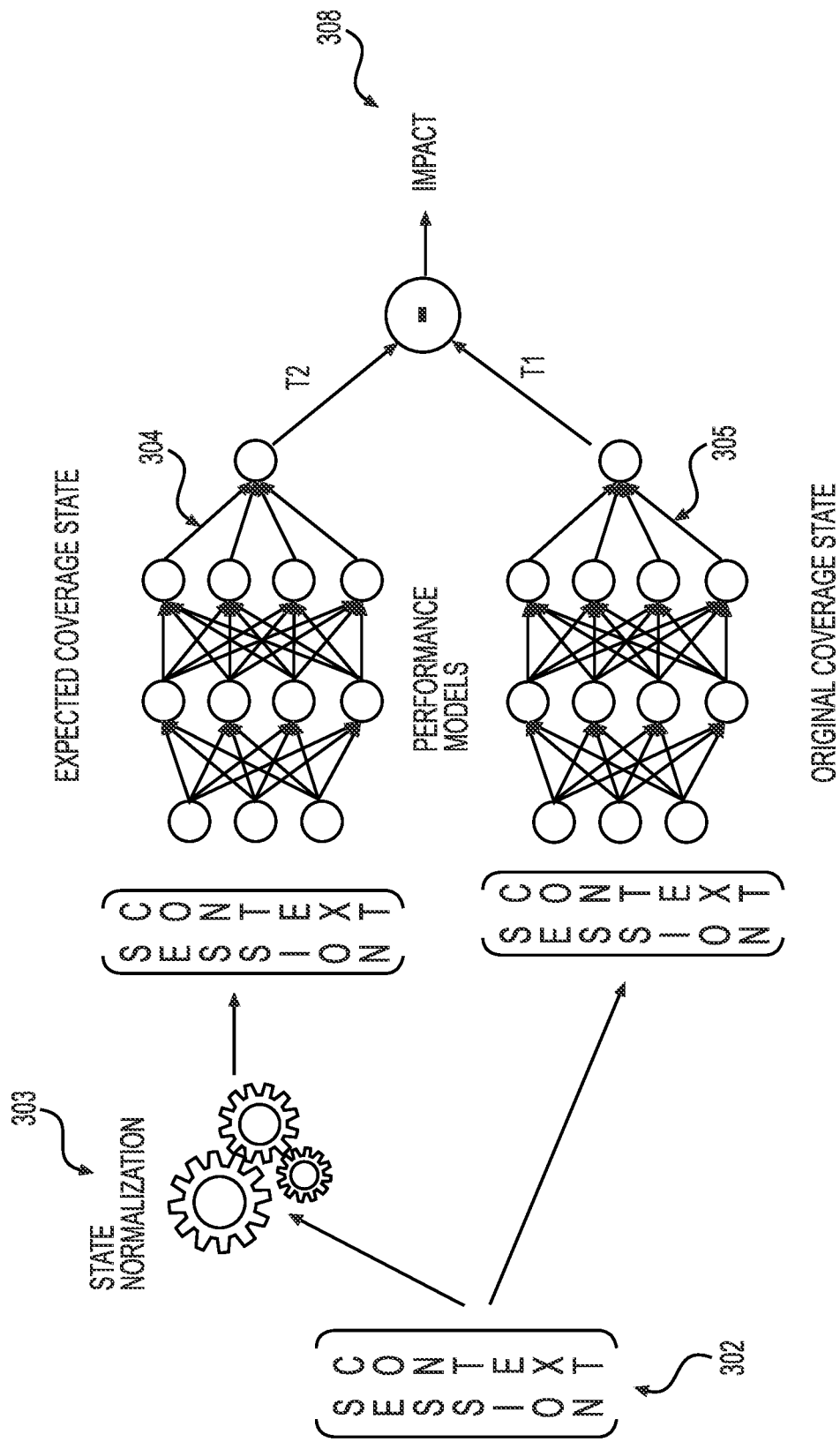
FIG. 3A is a flowchart of an example method for using performance models to determine sessions impacted by poor coverage from a serving cell.

FIG. 3A is a flowchart of an example method for using performance models to determine coverage degradation impact. The performance models 304, 305 can be used to determine an expected coverage state and a current (original) coverage state for a session at a cell, in an example. The process can start using session context 302, which can include various parameters regarding the session, such as signal quality, cell load, and interference level. The session context 302 can also include path loss, CQI, and NACK rate.

At stage 303, normalization can occur so that certain feature values are set to a normalized level for determining expected coverage. For example, as explained with respect to Table 1, a $75^{th}$ percentile NACK rate and nominal path loss and CQI at the cell's percentage level can be used. These normalized feature values can be used as inputs, along with the session context, in the performance model 304. The performance model 304 can output an expected throughput value T2. This value (T2) can be compared against an actual throughput at the cell during the session. The actual throughput can likewise be estimated by the performance model 305, which can be the same as performance model 304 in an example. The output of actual throughput can be T1. Alternatively, actual throughput T1 can be calculated in real time based on telemetry and without the need to estimate using the performance model 305.

The difference between T2 and T1 can indicate an impact 308, in an example. In one example, the difference between T2 and T1 must exceed a threshold before an impact 308 is indicated. The network analysis platform can track the number of impacts at a cell for purposes of identifying victim cells and displaying impact numbers on the GUI.

Figure 3B:
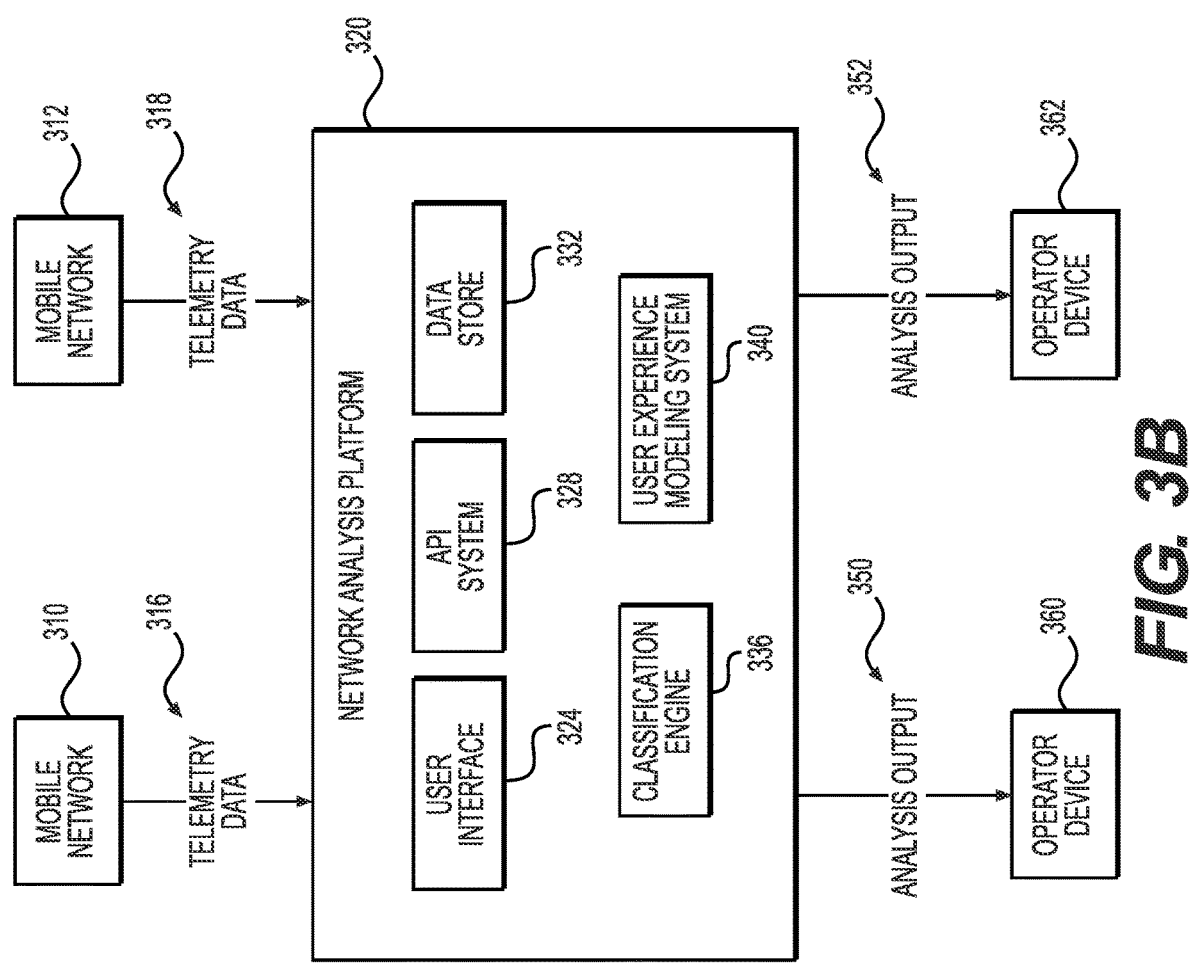
FIG. 3B is an illustration of example system components for poor coverage detection and root cause identification.

FIG. 3B shows an illustration of an example system that includes a network analysis platform 320 and a network 310. The network 310 can be a wireless network that provides network communication for mobile devices. For example, the network 310 can be at least one of a mobile network, cellular network, wireless network, wireless spectrum network, or any other network maintained by a network operator. In some examples, the network operator is a streaming media provider, internet service provider, vendor, or other entity associated with a network.

The mobile network 310 can send telemetry data 316 to the network analysis platform 320. The network analysis platform 320 can also receive information from a separate, second mobile network 312 that provides its own telemetry data 318. The telemetry data 316, 318 can provide a time-frequency characteristic and a spatial characteristic. In some examples, telemetry data 316, 318 includes at least one of: a timestamp of when an event occurred in the network 310, 312; a threshold relating to data bandwidth, download speed, call failure, or other aspect of the network has been exceeded, and at what time; the frequency of calls being dropped for VoiceIP data; the location of cell towers within the mobile network; customer complaints received, in which areas, and at what frequency; and any other data relating to the network 310, 312 and telemetry 316, 318. The platform 320 can monitor the network 310, 312 and collect the associated telemetry data 316, 318. In some embodiments, the telemetry data 316, 318 is stored within a datastore 332 within the platform 320 or available to the platform 320.

The telemetry data 316, 318 can also include at least one of user network session throughput information for at least one user network session, and user network session radio access network (RAN) information for at least one user network session. In some examples, RAN information includes information describing radio communication between a transceiver of an edge node of the network 310, 312 and a modem of a UE of the user network session. In some embodiments, RAN information for a user network session ("user session" or "session") includes at least one of: downlink coverage (RSRP, RSRQ) of the user session; downlink quality (SINR, CQI) experienced by the user session; uplink coverage (path loss, uplink power restriction) of the user session; uplink quality (PUSCH, PUCCH SINR) experienced by the user session; downlink modulation and coding for the user session; uplink modulation and coding for the user session; downlink PRB resources allocated for the user session; downlink PRB usage of cell; uplink PRB resources allocated for the user session; uplink PRB usage of cell; control channel utilization in cell; number of active users in cell on uplink and downlink; number of active users in cell perceived by user session; QCI of the user session; downlink NACK rate of the user session; downlink DTX rate of the user session; uplink NACK rate of the user session; uplink DTX rate of the user session; available bandwidth and control channel elements on uplink and downlink; and Power Headroom Reports (PHR) of the user session.

In some examples, the network 310, 312 includes at least one infrastructure element, such as, for example, a base station, a cell tower, and other elements of a mobile network infrastructure. The network 310, 312 can be a Long-Term Evolution ("LTE") network or a 5G network, for example. In some embodiments, the network 310, 312 includes at least one edge node. The edge node can include at least one of a radio transceiver, a power amplifier, and an antenna. In some examples, the edge node is constructed to exchange information with at least one user device (e.g., a mobile phone or IoT device that includes a wireless network interface device) using the radio transceiver of the edge node and a radio transceiver included in a wireless modem of the user device.

In some examples, the edge node of the network 310, 312 is a base station node. For example, the edge node can be an Evolved Node B ("eNodeB"). The edge station node can be communicatively coupled to at least one of a Radio Network Controller ("RNC"), a Mobility Management Entity ("MME") node, a gateway node (such as a serving gateway or packet data network gateway), and a home subscriber server ("HSS").

In some examples, prior to exchanging information with a user device, the edge node establishes a wireless communication session with the user device by performing a signaling process, the result of the signaling processing being an established communication session between the user device and the edge node of the network 310, 312. In some examples, each session between a user device and an edge node of the network is managed by an MME of the network 310, 312.

The network analysis platform 320 can be implemented by a mobile networking service, network monitoring and/or control service, network security service, internet service provider, or any other network service. In some examples, one or more aspects of the system can be enabled by a web-based software platform operable on a web server or distributed computing system. In some examples, the platform 320 can be implemented as at least one hardware device that includes a bus that interfaces with processors, a main memory, a processor-readable storage medium, and a network interface device. The bus can also interface with at least one of a display device and a user input device.

In some examples, at least one network interface device of the platform 320 is communicatively coupled to at least one network interface device of the network 310, 312 (e.g., an MME) directly or indirectly via one of a public network (e.g., the Internet) or a private network. In some examples, at least one network interface device of the platform 320 is communicatively coupled to a network interface device of at least one operator device 360, 362.

The platform 320 can include an API system 328 that provides an API that is used by a device (e.g., operator device 360, 362, a network monitoring system of the network 310, 312, a node of the network 310, 312) to communicate with the platform 320. In some examples, the API system 328 provides a REST API. The API system 328 can include a web server that provides a web-based API. The API system 328 can be configured to process requests received from a node of the mobile network 310, 312 (e.g., a network monitoring system) to receive telemetry data from the network 310, 312. In some embodiments, the API system 328 includes a web server that provides a web-based API.

In some examples, the platform 320 includes a user interface system 324. The user interface system 324 can be an application server (e.g., web server) that is configured to provide a user interface through which an operator device 360, 362 can interact with the platform 320. The platform 320 can process requests received from an operator device 360, 362 (e.g., through the API system 328 of the platform 320 or the user interface system 324 of the platform 320) relating to telemetry data 316, 318 from the network 310, 312. For example, the operator device 360, 362 can provide the platform 320 with connection information for establishing a network connection with a node of the mobile network 310, 312, and the platform 320 can use that connection information to establish a network connection with the node of the mobile network 310, 312 and receive telemetry data 316, 318 from the network 310 via the established network connection.

As mentioned above, the platform 320 can include a data store 322. The data store 322 can be a database (e.g., a relational database, a NoSQL database, a data lake, a graph database). The data store 322 include telemetry data of the network 310. The platform 320 can access telemetry data 316, 318 from the network 310, 312 and store the accessed telemetry data 316, 318 in the data store 332. The data store 332 can include one or more databases in which telemetry data 316, 318 collected from operators of mobile networks or other various entities is stored. In one example, the data store 332 includes a mobile network databank for storing mobile network data during an analysis of problems within the network.

The platform 320 can also include a user experience modeling system 340. In some examples, the modeling system 340 generates a trained user experience model that outputs a prediction of a user experience value given an input data set that includes data for one or more features included in RAN information of the network 310, 312. The data can include, for example, RAN information stored in the data store 332 and RAN information received as telemetry data 316, 318 from the network 310, 312. In some examples, each input data set input into the trained user experience model represents a user network session. For each input data set being used to train a user-experience model, the platform 320 can access information indicating at least one of uplink throughput, downlink throughput, voice quality, call drops, and setup failures. In some examples, for each input data set being used to train a user-experience model, the platform 320 stores information indicating at least one of uplink throughput, downlink throughput, voice quality, call drops, and setup failures.

In some examples, the modeling system 340 generates the trained user experience model to predict at least one of uplink throughput, downlink throughput, voice quality, call drops, and setup failures as a target of the model. The modeling system 340 can generate the trained user experience model based on user input received from the operator device 360, 362. The user input can identify at least one of a target for the model and a feature of RAN information to be used by the model. The platform 320 can store at least one trained user-experience model, such as by storing it within the data store 332. The platform 320 can also receive or access a trained user-experience model provided by an operator device 360, 362.

The platform 320 can be a multi-tenant platform that manages platform accounts for a plurality of networks 310, 312. For example, a first platform account can be associated with a first operator device 360 and first network 310, while a second platform account can be associated with a second operator device 362 and a second mobile network 312. In some examples, the platform 320 stores a first user-experience model for the first platform account and a second user-experience model for the second platform account. The first user-experience model can be trained on RAN information received from the first network 310, while the second user-experience model can be trained on RAN information received from the second network 312. Alternatively, the user-experience models can be trained based on combined information from both the first and second networks 310, 312. In some examples, the first user-experience model has a target selected by the first operator device 360, while the second user-experience model has a target selected by the second operator device 362.

The user experience modeling system 340 can include one or more of a local machine learning system (e.g., implemented in Python, R, or another language), a cloud-based machine learning client (e.g., an application communicatively coupled to a cloud-based machine learning system such as, for example, MICROSOFT AZURE MACHINE LEARNING SERVICE). At least one machine learning system included in the system 340 can be configured to perform one or more of: supervised learning (e.g., using logistic regression, back propagation neural networks, random forests, or decision trees), unsupervised learning (e.g., using an apriori algorithm or kmeans clustering), semi-supervised learning, reinforcement learning (e.g., using a Q-learning algorithm or temporal difference learning), and any other suitable learning style.

In some examples, at least one model generated by the system 340 implements at least one of: a regression algorithm (e.g., ordinary least squares, logistic regression, stepwise regression, multivariate adaptive regression splines, or locally estimated scatterplot smoothing), an instance-based method (e.g., k-nearest neighbor, learning vector quantization, or self-organizing map), a regularization method (e.g., ridge regression, least absolute shrinkage and selection operator, or elastic net), a decision tree learning method (e.g., classification and regression tree, iterative dichotomiser 3, C4.5, chi-squared automatic interaction detection, decision stump, random forest, multivariate adaptive regression splines, or gradient boosting machines), a Bayesian method (e.g., naïve Bayes, averaged one-dependence estimators, or Bayesian belief network), a kernel method (e.g., a support vector machine, a radial basis function, or a linear discriminant analysis), a clustering method (e.g., k-means clustering or expectation maximization), an associated rule learning algorithm (e.g., an apriori algorithm or an Eclat algorithm), an artificial neural network model (e.g., a Perceptron method, a back-propagation method, a Hopfield network method, a self-organizing map method, or a learning vector quantization method), a deep learning algorithm (e.g., a restricted Boltzmann machine, a deep belief network method, a convolutional network method, or a stacked auto-encoder method), a dimensionality reduction method (e.g., principal component analysis, partial least squares regression, Sammon mapping, multidimensional scaling, or projection pursuit), an ensemble method (e.g., boosting, bootstrapped aggregation, AdaBoost, stacked generalization, gradient boosting machine method, or random forest method), and any other suitable form of machine learning algorithm. In some examples, at least one processing portion of the system 340 can additionally or alternatively leverage: a probabilistic module, heuristic module, deterministic module, or any other suitable module leveraging any other suitable computation method, machine learning method or combination thereof. Any suitable machine learning approach can otherwise be incorporated in the system 340.

Figure 4A:
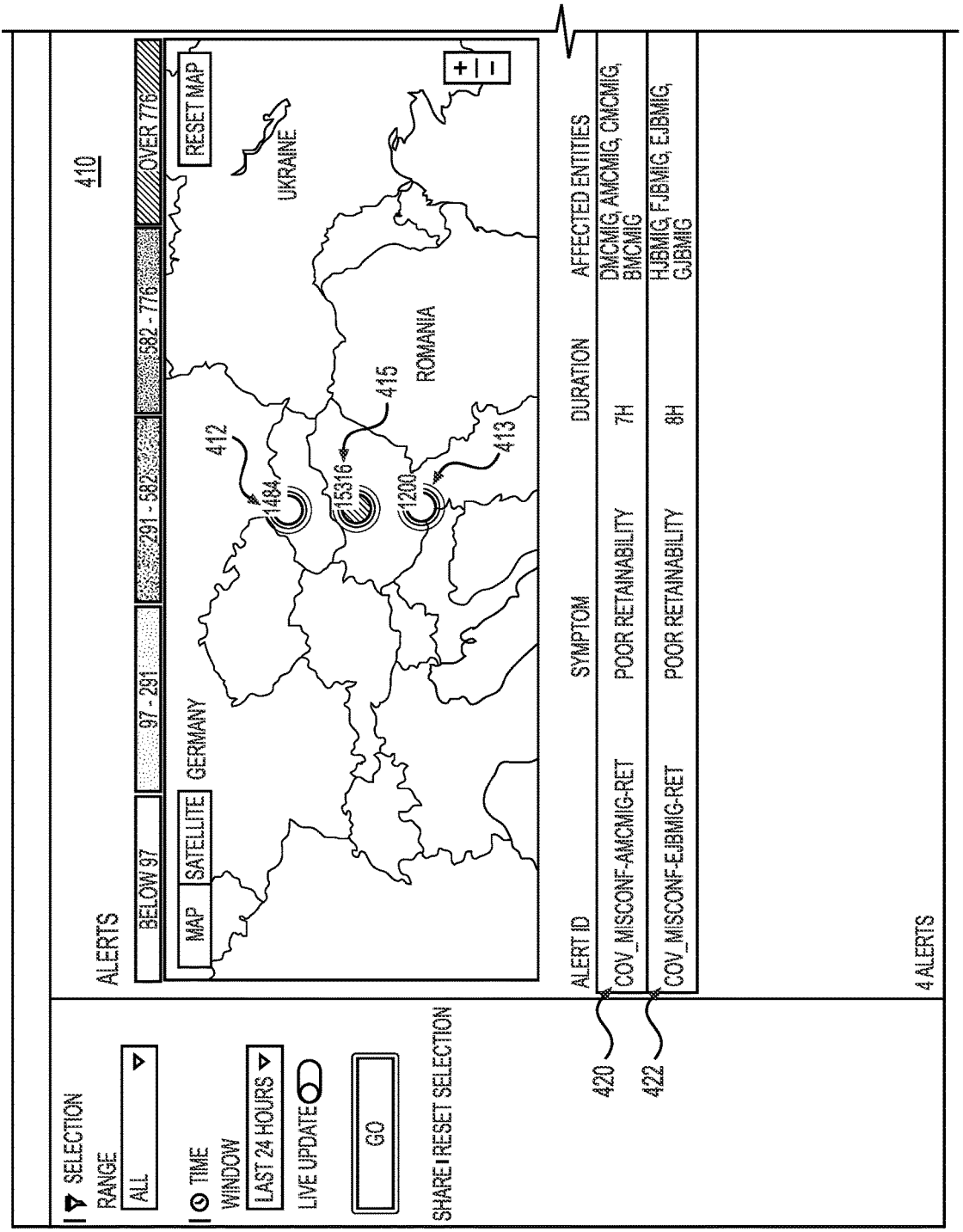
FIGS. 4A and 4B are illustrations of an example GUI screen for poor coverage detection and root cause identification.
Figure 4B:
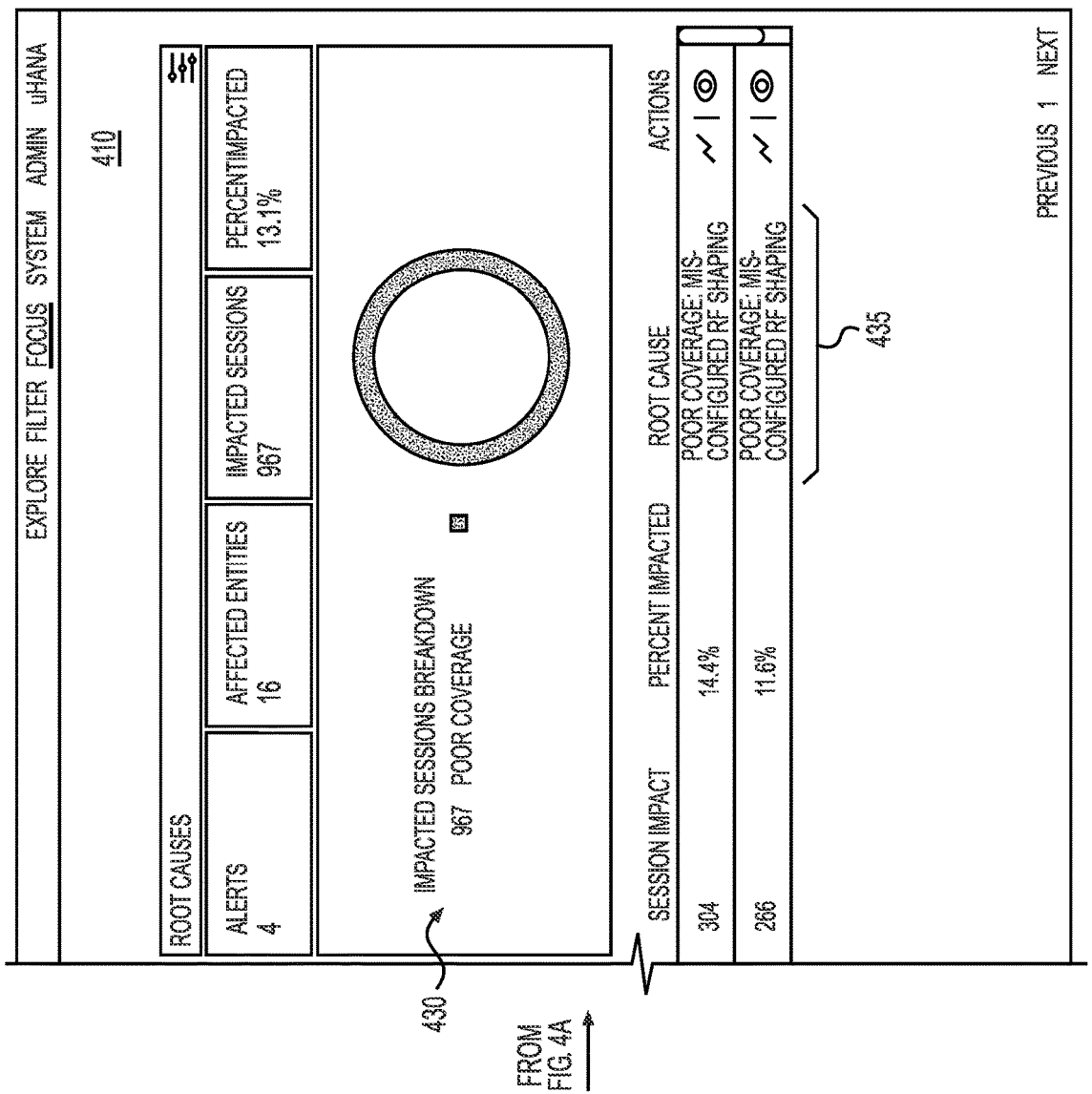

FIGS. 4A and 4B are illustrations of an example GUI screen 410 for coverage degradation detection and root cause identification. The screen 410 spans both FIGS. 4A and 4B. Beginning with FIG. 4A, a map area on the screen 410 can show geographic locations of base stations 412, 413, 415. Additionally, numbers of impacts for each base station 412, 413, 415 can be displayed on the GUI. In this example, base station 412 has 1484 impacts, base station 413 has 1200 impacts, and base station 415 has 15316 impacts. These impacts can be limited to a particular type, such as poor coverage, or can include impacts for multiple different performance features, such as load imbalance, uplink issues, and downlink issues. A threshold impact number can be 5000. Because base station 415 exceeds that threshold (having 15316 impacts), it can be highlighted differently on the GUI. This highlighting can indicate that the base station 15316 is a victim cell.

Alerts 420, 422 can be displayed on the GUI relative to one or more selected or displayed cells. In this example, the first alert 420 and second alert 422 both relate to poor retainability. These can be based on poor coverage impacts being above a threshold number for a period of time. Other alerts are also possible, such as a load imbalance based on poor downlink throughput.

More information can be provided on screen 410 as shown in FIG. 4B. In one example, a root cause 435 is shown for the alerts. For both alerts 420, 422, the root cause can be poor coverage due to misconfigured radio frequency ("RF") shaping. The administrator can investigate further to determine if that is based on transmit levels or tilt angle at the base station.

Additionally, screen 410 can give a breakdown 430 of the impacted sessions at the victim cell. In this example, the sessions are all impacted based on poor coverage. This could be based on the administrator filtering out just the issues related to poor coverage. However, other issue types can be determined using different performance models and different normalized factors.

Figure 5A:
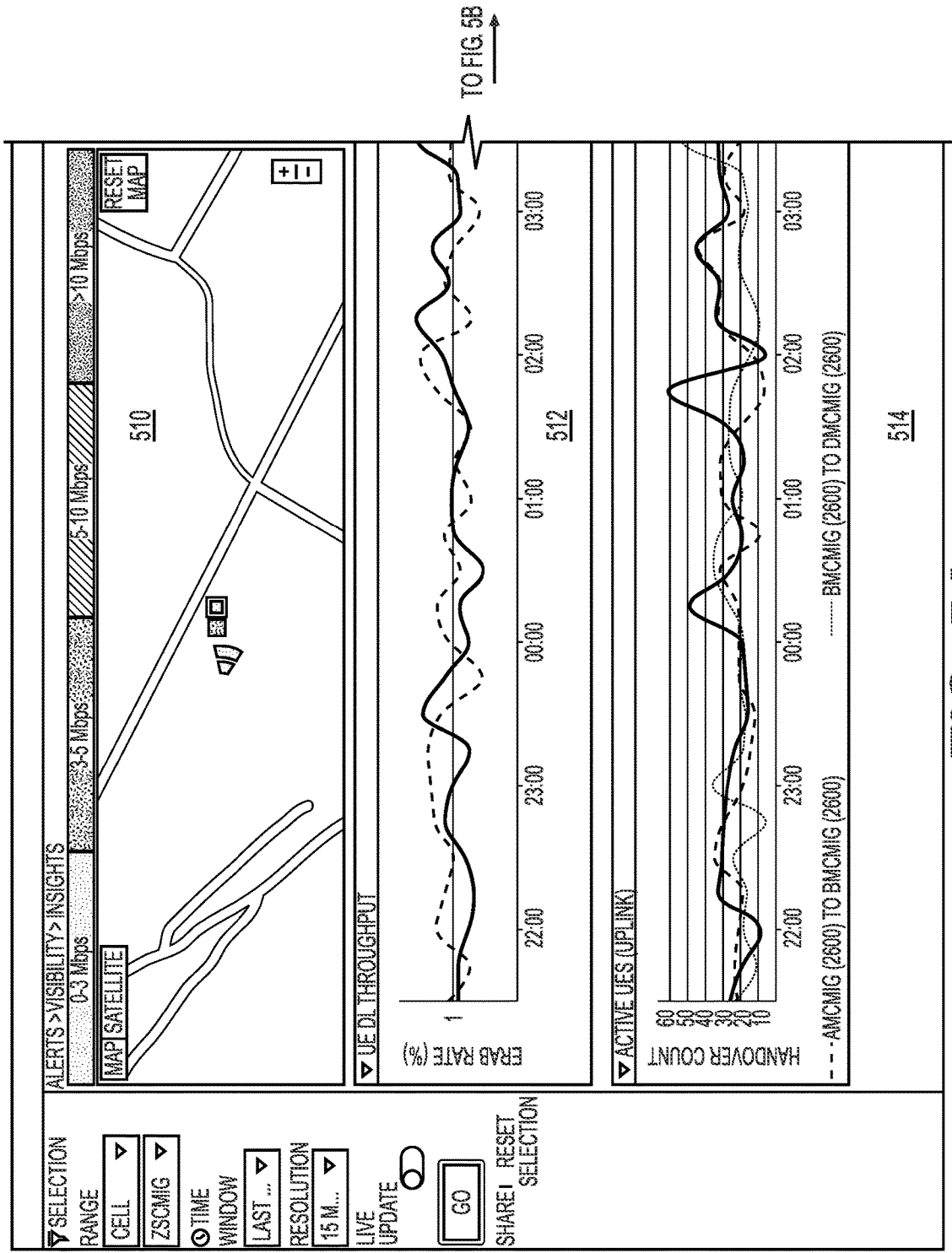
FIGS. 5A and 5B are illustrations of an example GUI screen for poor coverage detection and root cause identification.
Figure 5B:
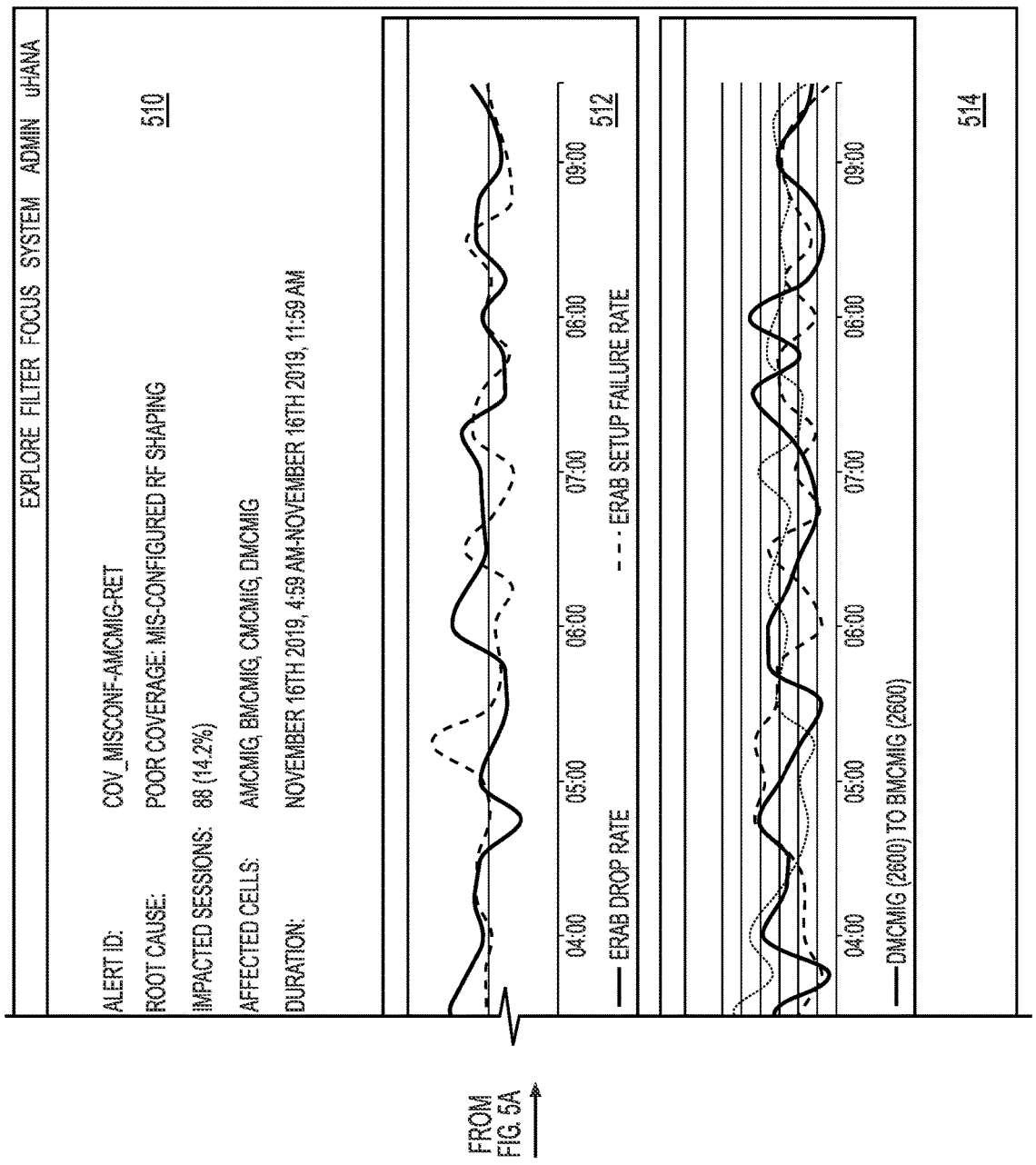

The user can select an alert in one example and see how various factors related to the alert changed during the time span over which the impacts were determined. For example, FIGS. 5A and 5B are illustrations of a second GUI screen 510 for poor coverage details. The second screen 510 can include panes 512, 514 having relevant data regarding the sessions impacted by poor coverage. A first pane 512 graphs E-UTRAN Radio Access Barrier ("ERAB") success rate over the time period. ERAB is one type of telemetry data from which CQI can be determined. A second pane 514 graphs active users (sessions) on an uplink over the period. This can show handovers of coming and going sessions, which can relate to poor coverage. FIG. 5B shows the second half of the second screen 510. These detail screens can allow an administrator to drill down for anomalies related to the impacts.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for detecting coverage degradation in a telco network, comprising:
   receiving telemetry data;
   determining a percentile of path loss for a first base station relative to an average path loss for multiple base stations in the telco network;
   for a wireless session, predicting an expected throughput based on at least a threshold non-acknowledged packet rate and the percentile of path loss;
   determining that the wireless session suffers from poor coverage based on comparing an actual throughput with the expected throughput; and
   based on a threshold number of wireless sessions suffering from the poor coverage at the first based station, indicating the poor coverage with respect to the first base station on a graphical user interface ("GUI").

2. The method of claim 1, wherein the normalized signal quality is determined based on at least one of: a percentile of the first sessions' path loss relative to signal quality of other sessions at the first base station, overall path loss across the plurality of base stations, an acknowledgement rate across the plurality of base stations, and a negative acknowledgement rate across the plurality of base stations.

3. The method of claim 1, wherein the predicting is performed by a model that considers natural path loss based on a distance between a user device and the first base station.

4. The method of claim 1, further comprising performing a root cause analysis of the poor coverage at the first base station, including:
   determining a threshold based on a distribution of average path loss across the plurality of base stations; and
   comparing an average path loss of the first base station to the threshold.

5. The method of claim 4, further comprising, based on the average path loss for the first base station exceeding a threshold, indicating that a root cause of the first base station's path loss is at least one of incorrect transmission power and electronic tilt configuration.

6. The method of claim 4, wherein determining the threshold comprises setting a threshold at the $75^{th}$ percentile of the distribution.

7. The method of claim 1, wherein a same performance model is used to determine actual throughput and predict the expected throughput.

8. A non-transitory, computer-readable medium containing instructions that, when executed by a hardware-based processor, performs stages for detecting coverage degradation in a telco network, the stages comprising:

receiving telemetry data;

determining a percentile of path loss for a first base station relative to an average path loss for multiple base stations in the telco network;

for a wireless session, predicting an expected throughput based on at least a threshold non-acknowledged packet rate and the percentile of path loss;

determining that the wireless session suffers from poor coverage based on comparing an actual throughput with the expected throughput; and based on a threshold number of wireless sessions suffering from the poor coverage at the first based station, indicating the poor coverage with respect to the first base station on a graphical user interface ("GUI").

9. The non-transitory, computer-readable medium of claim 8, wherein the normalized signal quality is determined based on at least one of: a percentile of the first sessions' path loss relative to signal quality of other sessions at the first base station, overall path loss across the plurality of base stations, an acknowledgement rate across the plurality of base stations, and a negative acknowledgement rate across the plurality of base stations.

10. The non-transitory, computer-readable medium of claim 8, wherein the predicting is performed by a model that considers natural path loss based on a distance between a user device and the first base station.

11. The non-transitory, computer-readable medium of claim 8, the stages further comprising performing a root cause analysis of the poor coverage at the first base station, including:

determining a threshold based a distribution of average path loss across the plurality of base stations; and comparing an average path loss of the first base station to the threshold.

12. The non-transitory, computer-readable medium of claim 11, the stages further comprising, based on the average path loss for the first base station exceeding a threshold, indicating that a root cause of the first base station's path loss is at least one of incorrect transmission power and electronic tilt configuration.

13. The non-transitory, computer-readable medium of claim 11, wherein determining the threshold comprises setting a threshold at the 75$^{th}$ percentile of the distribution.

14. The non-transitory, computer-readable medium of claim 8, wherein a same performance model is used to determine actual throughput and predict the expected throughput.

15. A system for detecting coverage degradation in a telco network, comprising:

a memory storage including a non-transitory, computer-readable medium comprising instructions; and a computing device including a hardware-based processor that executes the instructions to carry out stages comprising:

receiving telemetry data;

determining a percentile of path loss for a first base station relative to an average path loss for multiple base stations in the telco network;

for a wireless session, predicting an expected throughput based on at least a threshold non-acknowledged packet rate and the percentile of path loss;

determining that the wireless session suffers from poor coverage based on comparing an actual throughput with the expected throughput; and based on a threshold number of wireless sessions suffering from the poor coverage at the first based station, indicating the poor coverage with respect to the first base station on a graphical user interface ("GUI").

16. The system of claim 15, wherein the normalized signal quality is determined based on at least one of: a percentile of the first sessions' path loss relative to signal quality of other sessions at the first base station, overall path loss across the plurality of base stations; an acknowledgement rate across the plurality of base stations; and a negative acknowledgement rate across the plurality of base stations.

17. The system of claim 15, wherein the predicting is performed by a model that considers natural path loss based on a distance between a user device and the first base station.

18. The system of claim 15, the stages further comprising performing a root cause analysis of the poor coverage at the first base station, including:

determining a threshold based a distribution of average path loss across the plurality of base stations; and comparing an average path loss of the first base station to the threshold.

19. The system of claim 18, the stages further comprising, based on the average path loss for the first base station exceeding a threshold, indicating that a root cause of the first base station's path loss is at least one of incorrect transmission power and electronic tilt configuration.

20. The system of claim 18, wherein determining the threshold comprises setting a threshold at the 75$^{th}$ percentile of the distribution.

* * * * *